United States Patent [19]
Mori

[11] Patent Number: 4,585,298
[45] Date of Patent: Apr. 29, 1986

[54] PHOTORADIATOR FOR RADIATING LIGHT

[76] Inventor: Kei Mori, 3-16-3-501, Kaminoge, Setagaya-ku, Tokyo, Japan

[21] Appl. No.: 521,191

[22] Filed: Aug. 8, 1983

[30] Foreign Application Priority Data

Aug. 26, 1982 [JP] Japan ................................ 57-148314
Sep. 3, 1982 [JP] Japan ................................ 57-154448

[51] Int. Cl.$^4$ ........................... G02B 6/00; F21V 7/04
[52] U.S. Cl. ..................................... 350/96.10; 362/32
[58] Field of Search ............... 350/96.10, 96.28, 96.15, 350/96.24; 362/32; D26/3, 78, 79

[56] References Cited

U.S. PATENT DOCUMENTS

| 2,519,690 | 8/1950 | Recktenwald | 362/32 |
| 3,890,497 | 6/1975 | Rush | 362/32 |
| 4,344,110 | 8/1982 | Ruediger | 362/32 |
| 4,459,642 | 7/1984 | Mori | 362/32 |

FOREIGN PATENT DOCUMENTS 2029883 3/1980 United Kingdom ............ 350/96.24

*Primary Examiner*—William L. Sikes
*Attorney, Agent, or Firm*—Jordan and Hamburg

[57] ABSTRACT

A photoradiator has an elongate light conducting member which is supplied with converged light at one end thereof. Light radiating portions are arranged on the light conductor so that the light propagating through the light conductor may stream out in any desired light amount distribution along the axis of the light conductor. The radiating portions comprise spaced annular strips or spiral strips each being made of a material whose refractive index is larger than that of the light conductor. A mirror is positioned at the other end of the light conductor to reflect components of the incoming light which are substantially parallel to the axis of the light conductor, thereby promoting efficient radiation of the incoming light through the radiating portions.

23 Claims, 13 Drawing Figures

PHOTORADIATOR FOR RADIATING LIGHT

BACKGROUND OF THE INVENTION

The present invention relates to a photoradiator for effectively radiating light such as the sunlight to the ambience which is routed through a fiber optic cable or like light conducting member.

Effective use of solar energy is the key to energy saving today and has been studied in various fields actively. For the most effective use of solar energy, solar energy has to be availed as it is without being transformed into thermal energy, electrical energy or like different kind of energy. In light of this, I have made various proposals for an illumination system which utilizes solar energy. The illumination system employs a fiber optic cable through which the sunlight converged by a lens or the like is conducted to a desired location to stream out thereat to illuminate the ambience.

In the illumination system of the type described, the light advancing through the fiber optic cable has directivity. Therefore, if the light is output at a simple cut end of the cable, it becomes radiated over an angle which is usually as small as about 46 degrees. The light streaming through the simple cut end of the cable would fail to evenly illuminate a desired space such as a room. I have proposed in various forms a photoradiator which is designed to effectively diffuse light conducted by a fiber optic cable to provide even illumination over a wide range.

The present invention constitutes a farther improvement over such predecessors.

SUMMARY OF THE INVENTION

It is an object of the present invention to provide a photoradiator which allows light to be radiated in any desired quantity distribution in a desired direction along the periphery of a light conducting member.

It is another object of the present invention to provide a photoradiator which is capable of effectively radiating to the outside of a light conducting member even the light components which propagate through the light conducting member substantially parallel to the axis of the latter.

It is another object of the present invention to provide a generally improved photoradiator.

A photoradiator of the present invention includes an elongate light conducting member for conducting converged light from one end to the other end thereof. Radiating means radiate the light therethrough to the ambience radially outwardly of the light conducting member. Reflecting means is positioned at the other end of the light conducting member with a reflecting surface thereof faced inwardly of the light conducting member, thereby reflecting light incident thereon. The radiating means is constructed to set up a selective quantity distribution of the radiated light in at least one direction with respect to the light conducting member.

In accordance with the present invention, a photoradiator has an elongate light conducting member which is supplied with converged light at one end thereof. Light radiating portions are arranged on the light conductor so that the light propagating through the light conductor may stream out in any desired light amount distribution along the axis of the light conductor. The radiating portions comprise spaced annular strips or spiral strips each being made of a material whose refractive index is larger than that of the light conductor. A mirror is positioned at the other end of the light conductor to reflect components of the light which are substantially parallel to the axis of the light conductor, thereby promoting efficient radiation of the incoming light through the radiating portions.

The above and other objects, features and advantages of the present invention will become apparent from the following detailed description taken with the accompanying drawings.

BRIEF DESCRIPTION OF THE DRAWINGS

FIG. 5b is a section along line b—b of FIG. 5a;

DESCRIPTION OF THE PREFERRED EMBODIMENTS

While the photoradiator of the present invention is susceptible of numerous physical embodiments, depending upon the environment and requirements of use, substantial numbers of the herein shown and described embodiments have been made, tested and used, and all have performed in an eminently satisfactory manner.

Figure 1:
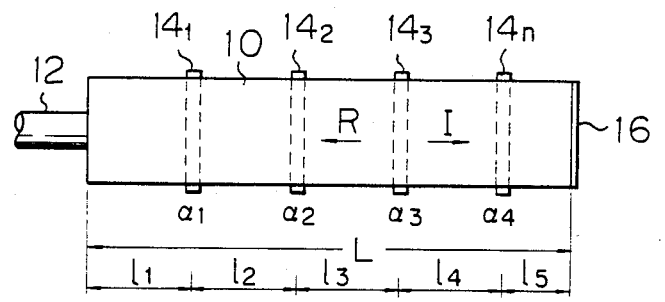
FIG. 1 is a side elevation of a photoradiator embodying the present invention.

Reffering to FIG. 1 of the drawings, a photoraidator embodying the present invention includes an elongate transparent light conducting member 10 made of silica glass or acrylic resin. One end of the light conducting member 10 connects to one end of a light conducting cable 12 the other end of which connects to a lens system (not shown). Light, such as the sunlight, is converged by the lens system into the cable 12 and routed therethrough to the light conducting member 10.

A plurality of light radiating members in the form of annular strips $14_1$–$14_n$ are carried on the light conductor 10 at spaced locations along the axis of the latter. In this particular embodiment, four light radiators $14_1$–$14_n$ are shown for convenience. Each light radiator 14 has a refractive index which is larger than that of the light conductor 10. A mirror 16 is rigidly mounted on the other end of the light conductor 10 such that its reflecting surface opposes the light input end. In this construction, the light propagates through the light conductor 10 as indicated by an arrow I while being reflected by the periphery of the light conductor 10 to stream radially outward at the individual light radiators $14_1$–$14_n$. The rest of the light, reached the mirror 16, is reflected thereby to follow the propagation path backward as indicated by an arrow R, while being radiated to the outside through the light radiators $14_1$–$14_n$.

For the description which will follow, the light conductor 10 is assumed to have a length L and carry the light radiators $14_1$–$14_n$ at spacings $l_1, l_2, l_3, l_4$ and $l_5$. The radiation coefficients of the light radiators $14_1$–$14_n$ are supposed to be $l_1, l_2, l_3,$ and $l_n$, respectively.

In accordance with a characteristic feature of the present invention, an arrangement is made such that light issues through the light radiators $14_1$–$14_n$ in a desired quantity distribution along the axis of the light conductor 10, thereby realizing any desired light distribution curve in illuminating the ambience.

Figure 2:
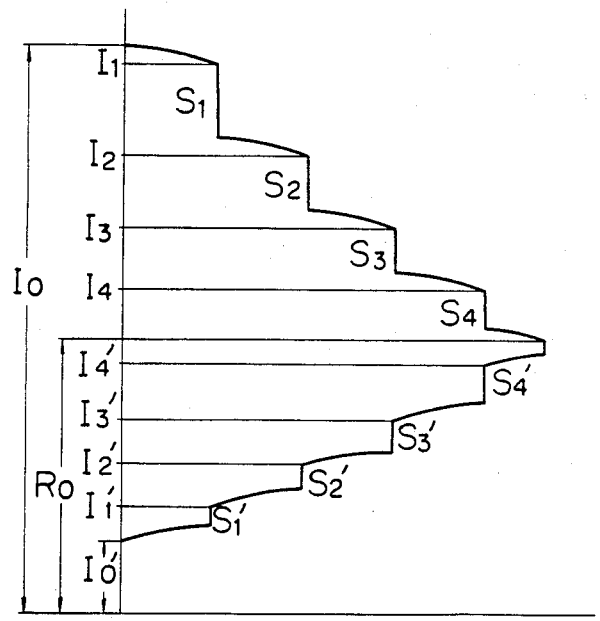
FIGS. 2 and 3 are plots representing operational principles of the present invention.
Figure 3:
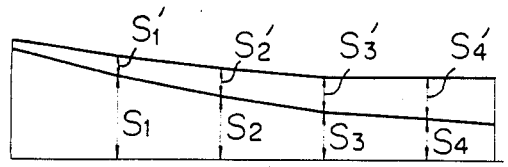

Referring to FIGS. 2 and 3, the operational principles of the present invention will be described using the construction shown in FIG. 1. Constants employed for the description are a total quantity of light $I_0$ introduced into the light conductor 10 from the cable 12, a quantity of light $R_0$ incident on the mirror 16, quantities of light $s_1$, $s_2$, $s_3$ and $s_4$ individually issuing from the light radiators $14_1$, $14_2$, $14_3$ and $14_n$ without the intermediary of the mirror 16, quantities of light $s_4'$, $s_3'$, $s_2'$ and $s_1'$ individually streaming through the light radiators $14_n$, $14_3$, $14_2$ and $14_1$ after being reflected by the mirror 16, quantities of light $I_1$, $I_2$, $I_3$ and $I_4$ individually reaching the light radiators $14_1$, $14_2$, $14_3$ and $14_4$ upon entry into the light conductor 10 from the cable 12, quantities of light $I_4'$, $I_3'$, $I_2'$ and $I_1'$ individually reflected by the mirror 16 to become incident on the light radiators $14_n$, $14_3$, $14_2$ and $14_1$, and a quantity of light $I_0'$ reflected by the mirror 16 to return to the light input end of the light conductor 10 where the cable 12 is located.

Supposing that the radiation coefficients $\alpha_1, \alpha_2 \ldots \alpha_n$ ($n=4$ in this embodiment) of the light radiators $14_1$, $14_2$ $\ldots 14_n$ are the same (represented by $\alpha$ hereinafter), the quantity of light $I_n$ reaching any one of the first to "n" light radiators counted from the cable side is expressed as:

$$I_1 = I_0 e^{-\sigma l_1} \qquad \text{Eq. (1)}$$

$$s_1 = \alpha I_1 = \alpha I_0 e^{-\sigma l_1} \qquad \text{Eq. (2)}$$

$$I_2 = (I_1 - s_1)e^{-\sigma l_2} = (1-\alpha)I_0 e^{-\sigma(l_1+l_2)} \qquad \text{Eq. (3)}$$

$$s_2 = \alpha I_2 = \alpha(1-\alpha)I_0 e^{-\sigma(l_1+l_2)} \qquad \text{Eq. (4)}$$

where $\sigma$ is the absorption of the light conductor 10.

In the same manner, the quantity $I_n$ at the "n" light radiator $14_n$ is produced by:

$$I_n = (I_{n-1} - s_{n-1})e^{-\sigma l_n} \qquad \text{Eq. (5)}$$

$$= (1-\alpha)^{n-1} I_0 e^{-\sigma(\sum_{j=1}^{n} l_j)}$$

Thus, the quantity $s_n$ radiated from the "n" light radiator is:

$$s_n = \alpha I_n = \alpha(1-\alpha)^{n-1} I_0 e^{-\sigma(\sum_{j=1}^{n} l_j)} \qquad \text{Eq. (6)}$$

The quantity of light $R_0$ allowed to reach the mirror 16 in the above situation is expressed as:

$$R_0 = (I_n - s_n)e^{-\sigma l_{n+1}} \qquad \text{Eq. (7)}$$

$$= (1-\alpha)^n I_0 e^{-\sigma(\sum_{j=1}^{n+1} l_j)}$$

where $$\sum_{j=1}^{n+1} l_j = L.$$

The light reflected by the mirror 16 propagates backward through the light conductor 10 toward the light input end. Again, this part of the light is absorbed by the light conductor 10 or radiated through the light radiators $14_4$, $14_3$, $14_2$ and $14_1$. The quantity of light $I_n'$ reaching the "n (=4)" light radiator is obtained as:

$$\begin{aligned} I_n' &= (1-\delta)R_0 e^{-\sigma l_{n+1}} \\ &= (1-\delta)(1-\alpha)^n I_0 e^{-\sigma(L+l_{n+1})} \end{aligned} \qquad \text{Eq. (8)}$$

where $\delta$ is the reflection coefficient of the mirror 16.

Therefore, the quantity of light $s_n'$ issuing from the "n" light radiator is:

$$s_n' = \alpha I_n' = (1-\delta)\alpha(1-\alpha)^n I_0 e^{-\sigma(L+l_{n+1})} \qquad \text{Eq. (9)}$$

In the same manner, the quantity of light $I_1'$ reaching the first light radiator $14_1$ is produced by:

$$\begin{aligned} I_1' &= (I_2' - s_2')e^{-\sigma l_2} \\ &= (1-\delta)(1-\alpha)^{2n-1} I_0 e^{-\sigma(2L-l_1)} \end{aligned} \qquad \text{Eq. (10)}$$

The light quantity $s_1'$ emanating from the first light radiator $14_1$ is:

$$s_1' = \alpha I_1' = (1-\delta)\alpha(1-\alpha)^{2n-1} I_0 e^{-\sigma(2L-l_1)} \qquad \text{Eq. (11)}$$

The light amount $I_0'$ returned to the light input end of the light conductor 10 is obtained as:

$$\begin{aligned} I_0' &= (I_1' - s_1')e^{-\sigma l_1} \\ &= (1-\delta)(1-\alpha)^{2n} I_0 e^{-2\sigma L} \end{aligned} \qquad \text{Eq. (12)}$$

In the above equations, light attenuation inside the light conductor 10 may generally be represented by the following expression:

$$\begin{aligned} I_i' &= (I_{i-1}' - s_{i-1}')e^{-\sigma l_{i+1}} \\ &= (1-\delta)(1-\alpha)^{2n-i} I_0 e^{-\sigma(L+\sum_{j=i+1}^{n+1} l_j)} \end{aligned} \qquad \text{Eq. (13)}$$

In the equations shown above, because all the factors $\sigma$, $I_0$, $\alpha$, $L$, $n$ and the like are known, it is possible to obtain the individual values $s_1, s_2 \ldots s_n$, $R_0$, $s_1'$, $s_2' \ldots s_n'$ and $I_0'$ by determining relations between $s_1+s_1'$, $s_2+s_2' \ldots s_n+s_n'$ inasmuch as the number of unknowns and that of equations are the same. They in turn will provide the distances $l_1, l_2 \ldots l_n$ between the adjacent light radiators. Suppose, for example, that light input from the cable 12 into the conductor 10 is radiated by each light radiator by an amount $s_i$, light reflected by the mirror 16 is radiated by the light radiator by an amount $s_1'$, and an average amount of light actually radiated from the light radiators is $\bar{S}$. Then, the light will stream through the individual light radiators in any desired quantity distribution under the following conditions:

$$\bar{S} = \frac{1}{n} \sum_{i=1}^{n} (s_i + s_1')$$

where n is the number of the radiators;

$$S_i = (1+B_i)\bar{S}$$

where $S_i$ is a desired (set) quantity of light to issue from a desired light radiator, and $$\sum_{i=1}^{n} (1+B_i) = 1, S_i = S\left(\sum_{j=1}^{i} l_j\right) \text{; and}$$

$$\frac{|s_i + s'_i| - S_i}{S_i} << \epsilon$$

where $\epsilon << 1$ and on the order of $10^{-3}$, for example.

It will thus be seen that if the spacings between the adjacent light radiators $14_1$–$14_n$ are selected to satisfy the conditions stated above, light can be radiated in any desired quantity from each of the light radiators thereby setting up a desired light distribution curve along the axis of the light conductor 10. If desired, the factor $B_i$ may be made zero in order to emit a same quantity of light from all the light radiators $14_1$–$14_n$. This would illuminate the ambience evenly with a same intensity throughout the length of the light conductor 10.

In the above description, a desired light distribution has been implemented by designing the spacings between adjacent light radiators as desired, while selecting a common radiation coefficient for all the radiators. Instead, the radiation coefficient may be varied from one radiator to another while forming the radiators at equally spaced positions on the light conductor 10, in which case the various factors will be expressed as:

$$I_1 = I_0 e^{-\sigma l} \qquad \text{Eq. (1')}$$

$$s_1 = \alpha_1 I_1 = \alpha_1 I_0 e^{-\sigma l} \qquad \text{Eq. (2')}$$

$$I_2 = (I_1 - s_1)e^{-\sigma l} = (1 - \alpha_1)I_0 e^{-2\sigma l} \qquad \text{Eq. (3')}$$

$$s_2 = \alpha_2 I_2 = \alpha_2(1 - \alpha_1)I_0 e^{-2\sigma l} \qquad \text{Eq. (4')}$$

$$I_n = (I_{n-1} - s_{n-1})e^{-\sigma l} = \prod_{j=1}^{n-1}(1 - \alpha_j)I_0 e^{-n\sigma l} \qquad \text{Eq. (5')}$$

$$s_n = \alpha_n I_n = \alpha_n \prod_{j=1}^{n-1}(1 - \alpha_j) \cdot I_0 e^{-n\sigma l} \qquad \text{Eq. (6')}$$

$$R_0 = (I_n - s_n)e^{-\sigma l} = (1 - \delta)\prod_{j=1}^{n}(1 - \alpha_j) \cdot I_0 e^{-\sigma l} \qquad \text{Eq. (7')}$$

$$\Gamma_n = (1 - \delta)R_0 e^{-\sigma l} \qquad \text{Eq. (8')}$$
$$= (1 - \delta)\prod_{j=1}^{n}(1 - \alpha_j) \cdot I_0 e^{-\sigma(L+l)}$$

$$S'_n = \alpha_n I_n \qquad \text{Eq. (9')}$$
$$= (1 - \delta)\alpha_n \prod_{j=1}^{n}(1 - \alpha_j) \cdot I_0 e^{-\sigma(L+l)}$$

$$\Gamma_1 = (I_2 - s'_2)e^{-\sigma l} \qquad \text{Eq. (10')}$$
$$= (1 - \delta)\prod_{j=2}^{n+1}(1 - \alpha_j)^2(1 - \alpha_1)I_0 e^{-\sigma(2L-l)}$$

$$s'_1 = \alpha_1 \Gamma_1 \qquad \text{Eq. (11')}$$
$$= (1 - \delta)\alpha_1 \prod_{j=2}^{n+1}(1 - \alpha_j)^2(1 - \alpha_1)I_0 e^{-\sigma(2L-l)}$$

$$I_0 = (\Gamma_1 - s'_1)e^{-\sigma l} \qquad \text{Eq. (12')}$$
$$= (1 - \delta)\prod_{j=1}^{n}(1 - \alpha_j)^2 \cdot I_0 e^{-2\sigma L}$$

In conjunction with the above equations, the attenuation of light inside the light conductor 10 may be expressed as:

$$\Gamma_i = (\Gamma_{i+1} - s'_{i+1})e^{-\sigma l} \qquad \text{Eq. (13')}$$
$$= (1 - \delta)\prod_{j=i+1}^{n}(1 - \alpha_j)\prod_{j=1}^{n}(1 - \alpha_j)I_0 e^{-\sigma(L+(n+1-i)l)}$$

To summarize the embodiment described above, the elongate light conductor 10 carries thereon a plurality of annular light radiators 14 at spaced locations along the axis thereof. The distance between adjacent light radiators or the radiation coefficient of each light radiator may be selected so that any desired light distribution curve is established along the axis of the light conductor 10. It will be seen that the radiation coefficient is determined by, for example, the width of the radiator, i.e. length thereof in the axial direction of the conductor 10.

Figure 4:
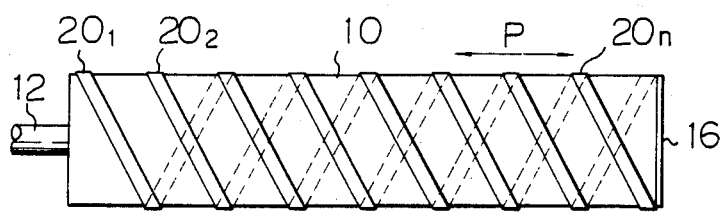
FIG. 4 is a view similar to FIG. 1 but showing another embodiment of the present invention.

Referring to FIG. 4, a second embodiment of the present invention is shown which is distinguished from the first by a spiral configuration of light radiators. As shown, a plurality of spiral strips made of a light radiating material extend throughout the length of the light conductor 10, two spiral strips $20_1$ and $20_2$ being shown in the drawing. Again, any desired light radiation coefficient is achievable for each light radiator $20_1$ or $20_2$ by selecting a width or a pitch P of each light radiator accordingly, along the axis of the light conductor 10. The rest of the construction, including the mirror 16, is the same as in the first embodiment.

if desired, the radiators, whether annular or spiral, may be formed each in a discontinuous configuration so that the resulting light distribution becomes uneven in the radial direction of the light conductor 10 as well.

Figure 5A:
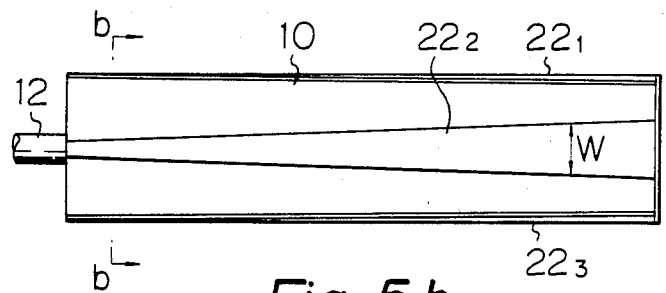
FIG. 5a is a side elevation of another embodiment of the present invention.
Figure 5B:
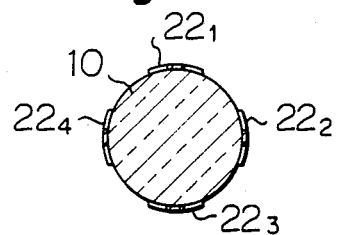

A third embodiment of the present invention is shown in FIGS. 5a and 5b. A plurality of light radiators, $22_1$–$22_4$ extend individually along the axis of the light conductor 10. As best shown in FIG. 5b, the light radiators $22_1$–$22_4$ are spaced from adjacent ones along the circumference of the light conductor 10. The widths of the light radiators, represented by the width W of the radiator $22_2$, may be so determined along the axis of the light conductor 10 as to satisfy the equations previously shown, thereby setting up desired light distributions in the axial direction of the conductor 10.

While the light radiators described so far have comprised annular or spiral members each having a refractive index larger than that of the light conductor 10, their role may be played by annular or spiral grooves formed in a light conductor, as disclosed in my U.S. Patent Application Ser. No. 490,685 entitled "Photoradiator And Method of Producing Same". Such implementations will be outlined with reference to FIGS. 6 and 7.

Figure 6:
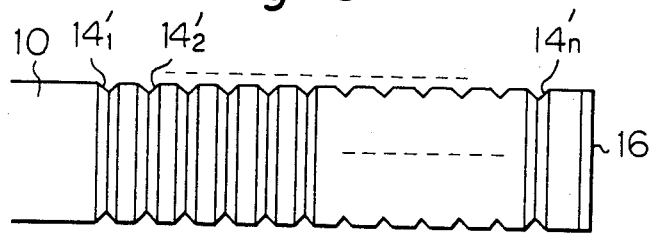
FIGS. 6 and 7 are side elevations of alternative light radiating means applicable to the present invention.
Figure 7:
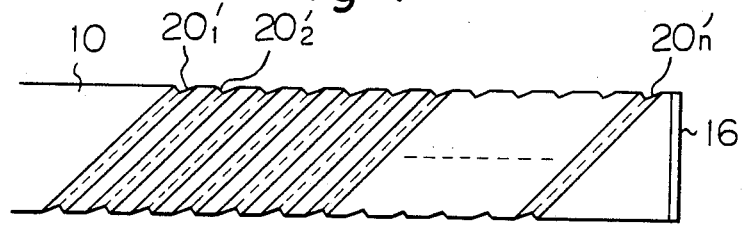

In FIG. 6, the elongate light conducting member 10 is formed with a number of annular grooves $14_1'$–$14_n'$ at spaced positions along the axis thereof. In FIG. 7, on the other hand, the light conducting member 10 is formed with spiral grooves $20_1'$ and $20_2'$ from one end to the other end thereof. It will be understood that the radiation coefficient may be distributed as desired by selecting, for example, a specific depth in the case of the annular grooves or a specific depth or a pitch in the case of the spiral grooves.

Figure 8:
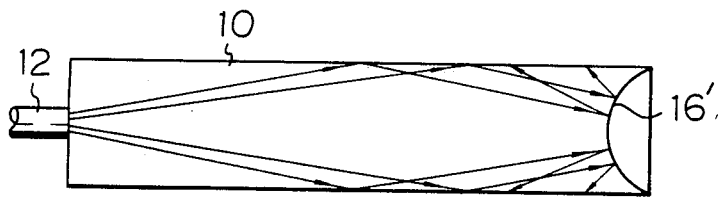
FIGS. 8–12 are sections showing various mirror configurations applicable to the present invention.
Figure 9:
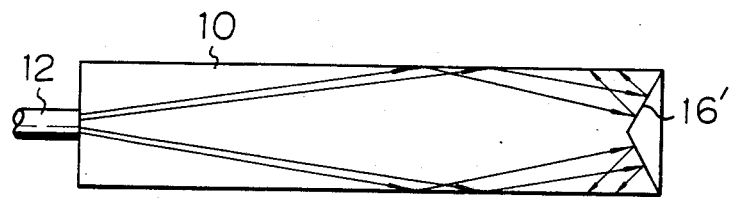
Figure 10:
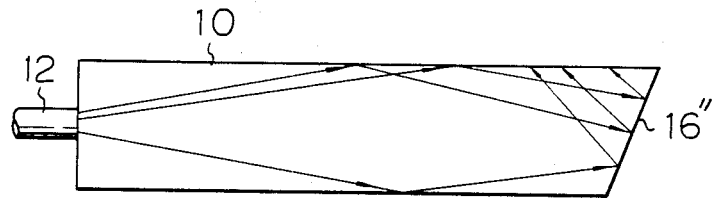

In the foregoing embodiments, the mirror 16 (16') employed for efficient light radiation has been oriented perpendicular to the axis of the light conductor 10. Generally, the light routed by the cable 12 into the light conductor 10 includes components which are substantially parallel to the axis of the light conductor 10 and this part of the light is allowed to directly reach the mirror 16 without being reflected by the periphery of the light conductor 10 or, if reflected, a small number of times. Such light components tends to fail to stream through the light radiators as represented by the Eq. (12) or (12'). Reference will now be made to FIGS. 8-10 which individually illustrate other embodiments of the present invention designed to effectively steer even the substantially parallel components to the ambience of the light conductor 10. In FIGS. 8-10, no light radiators are shown for the simplicity of illustration.

The light conductor 10 shown in each of FIGS. 8 and 9 is furnished with a mirror 16' which is formed convex to the light input end of the light conductor 10. The conductor 10 in FIG. 10 has a mirror 16' which is suitably inclined relative to the axis of the light conductor 10. In any of such constructions, substantially parallel components of light incident on the mirror 16' will become unparallel to the axis of the light conductor 10 when reflected by the mirror 16' and, therefore, will be reflected a larger number of times by the periphery of the light conductor 10 while propagating toward the light input end. This part of the light is more apt to break through the light radiators and thereby increase the light radiation efficiency of the photoradiator, compared to the case with the perpendicular mirror 16.

Figure 11:
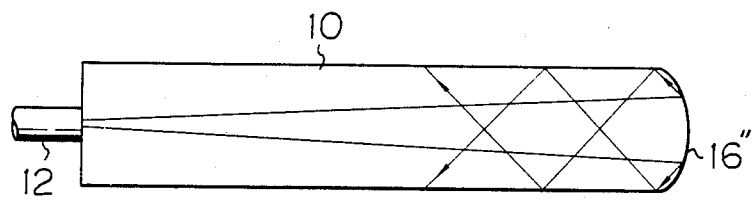
Figure 12:
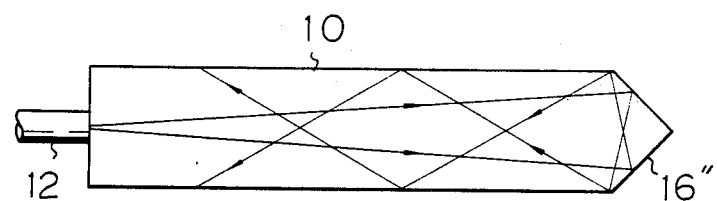

Modifications to the mirror configurations described above with reference to FIGS. 8 and 9 are shown in FIGS. 11 and 12, respectively. The mirror 16" in FIG. 11 is concave to the light input end of the light conductor 10 and so is the mirror 16" of FIG. 12. It will be apparent that the mirrors 16" shown in FIGS. 11 and 12, like the mirrors 16' of FIGS. 8 and 9, effectively reflect substantially parallel components in different directions so that this part of the light may also stream through the light radiators before routed back to the light input end.

In summary, it will be seen that the present invention provides a photoradiator which, despite its simple construction, realizes any desired light quality distribution at least along the axis of a light conducting member and causes even substantially parallel light components entered the light conductor to be steered efficiently to the ambience.

Various modifications will become possible for those skilled in the art after receiving the teachings of the present disclosure without departing from the scope thereof. For example, the mirror 16 or 16' for reflecting substantially parallel light components may be replaced by the end of the light conductor itself where it is located, if that end is suitably treated to reflect the light coponents concerned in the same manner. Again, the reflecting end of the light conductor may be perpendicular or angled to the axis of the light conductor, or convex or concave to the other or light input end of the light conductor.

What is claimed is:

1. Photoradiator comprising:

an elongate light conducting member for conducting converged light from one end to the other end thereof;

radiating means for radiating the light therethrough to the ambience radially outwardly of the light conducting member, said radiating means comprising a plurality of radiating means positioned at spaced locations along the axis of the light conducting member; and reflecting means for reflecting light incident thereon, said reflecting means being positioned at said other end of the light conducting member with a reflecting surface thereof faced inwardly of the light conducting member;

said radiating means being constructed to set up a selective quantity distribution of the radiated light at least along an axis of the light conducting member;

said radiating means being constructed such that the total quantity of light $s_i$ radiated through each of the radiating means after being introduced into the light conducting member and light $s_i'$ radiated through said radiating means after being reflected by the reflecting means, $s_i + s_i'$, has a specific value relative to the other radiating means, in which a selected amount of light $S_i$ to be radiated from the radiating means satisfies the equation:

$$S_i = (1 + B_i)\bar{S}$$

where $$\bar{S} = \frac{1}{n} \sum_{i=1}^{n} (s_i + s'_i),$$

n is the number of the radiating means, $B_i$ is a preselected value, and $$\sum_{i=1}^{n} (1 + B_i) = 1.$$

2. Photoradiator as claimed in claim 1, in which the reflecting means comprises a mirror.

3. Photoradiator as claimed in claim 2, in which the mirror is positioned perpendicular to the axis of the light conducting member.

4. Photoradiator as claimed in claim 2, in which the mirror is convex to said one end of the light conducting member.

5. Photoradiator as claimed in claim 2, in which the mirror is concave to said one end of the light conducting member.

6. Photoradiator as claimed in claim 2, in which the mirror is inclined relative to the axis of the light conducting member.

7. Photoradiator as claimed in claim 1, in which the reflecting means comprises said other end of the light conducting member which is treated for reflection.

8. Photoradiator as claimed in claim 7, in which said other end of the light conducting member is perpendicular to the axis of the light conducting member.

9. Photoradiator as claimed in claim 7, in which said other end of the light conducting member is convex to said one end.

10. Photoradiator as claimed in claim 7, in which said other end of the light conducting member is concave to said one end.

11. Photoradiator as claimed in claim 7, in which said other end of the light conducting member is inclined relative to the axis of the light conducting member.

12. Photoradiator as claimed in claim 1, in which the radiating means are positioned at distances along the axis of the light conducting member.

13. Photoradiator as claimed in claim 1, in which the radiating means are provided with a same radiation coefficient as each other.

14. Photoradiator as claimed in claim 1, in which the radiating means comprise annular spaced strips of a light transmitting material formed on the outer periphery of the light conducting member, said material being higher in refractive index than the light conducting member.

15. Photoradiator as claimed in claim 1, in which the radiating means comprise annular spaced grooves formed in the outer periphery of the light conducting member.

16. Photoradiator comprising:
an elongate light conducting member for conducting converged light from one end to the other end thereof;
radiating means for radiating the light therethrough to the ambience radially outwardly of the light conducting member, said radiating means comprising a plurality of radiating means positioned at spaced locations on the light conducting member; and
reflecting means for reflecting light incident thereon, said reflecting means being positioned at said other end of the light conducting member with a reflecting surface thereof faced inwardly of the light conducting member;
said radiating means being constructed to set up a selective quantity distribution of the radiated light at least along an axis of the light conducting member;
said radiating means being constructed such that the total quantity of light $s_i$ radiated through each of the radiating means after being introduced into the light conducting member and light $s_i'$ radiated through said radiating means after being reflected by the reflecting means, $s_i + s_i'$, has a specific value relative to the other radiating means, in which a selected amount of light $S_i$ to be radiated from the radiating means satisfies the equation:

$$S_i = (1 + B_i)\bar{S}$$

where $$\bar{S} = \frac{1}{n} \sum_{i=1}^{n} (s_i + s'_i),$$

n is the number of the radiating means, $B_i$ is a preselected value, and $$\sum_{i=1}^{n} (1 + B_i) = 1.$$

17. Photoradiator as claimed in claim 16, in which the radiating means comprises a plurality of continuous radiating means extending along the axis of the light conducting member.

18. Photoradiator as claimed in claim 17, in which a total quantity of light $s_i$ radiated through each of the radiating means after being introduced into the light conducting member and light $s_i'$ radiated through said radiating means after being reflected by the reflecting means, $s_i + s_i'$, is determined as a function of the length of the light conducting member measured from said one end.

19. Photoradiator as claimed in claim 17, in which the radiating means comprise elongate strips formed on the light conducting member and made of a material having a larger refractive index than the light conducting member.

20. Photoradiator as claimed in claim 19, in which each of the strips extends spirally along the axis of the light conducting member.

21. Photoradiator as claimed in claim 19, in which each of the strips extends linearly along the axis of the light conducting member.

22. Photoradiator as claimed in claim 17, in which the radiating means comprise grooves formed in the outer periphery of the light conducting member.

23. Photoradiator as claimed in claim 22, in which each of the grooves extends spirally along the axis of the light conducting member.

* * * * *